United States Patent [19]

Thomason et al.

[11] 3,989,031

[45] Nov. 2, 1976

[54] SOLAR HEAT COLLECTOR

[76] Inventors: Harry E. Thomason; Harry Jack Lee Thomason, Jr., both of 6802 Walker Mill Road, SE., Washington, D.C. 20027

[22] Filed: Oct. 29, 1974

[21] Appl. No.: 518,577

[52] U.S. Cl. .................................................. 126/271
[51] Int. Cl.² ............................................ F24J 3/02
[58] Field of Search ............ 126/270, 271; 237/1 A; 165/170

[56] References Cited
UNITED STATES PATENTS

| | | | |
|---|---|---|---|
| 2,602,646 | 7/1952 | Colonna | 165/170 |
| 3,145,707 | 8/1964 | Thomason | 126/271 |
| 3,399,664 | 9/1968 | Suhay | 126/271 |

FOREIGN PATENTS OR APPLICATIONS

| 671,251 | 12/1929 | France | 126/271 |
|---|---|---|---|

Primary Examiner—Kenneth W. Sprague
Assistant Examiner—James C. Yeung

[57] ABSTRACT

Open-flow solar heat collectors have been used since 1959 in Thomason Solar House No. 1, similar to those disclosed in U.S. Pat. Nos. 3,145,707 and 3,215,134. Improvements were needed to avoid heat loss, vapor loss, and condensation, near the top and bottom of the corrugated solar heat collector sheet.

In the present invention a transition area or transition section is used to change the collector sheet from its irregular or non-planar configuration to a substantially planar configuration. At the bottom, the irregular, non-planar sheet may be formed to a planar configuration and then shaped to form a collector trough with an outlet for warm water flowing therefrom. At the top, the irregular, non-planar collector sheet may be changed, at the transition area or section, to a substantially planar configuration and substantially sealed to, or adjacent to, the collector glazing material to reduce heat and vapor loss at the top.

10 Claims, 8 Drawing Figures

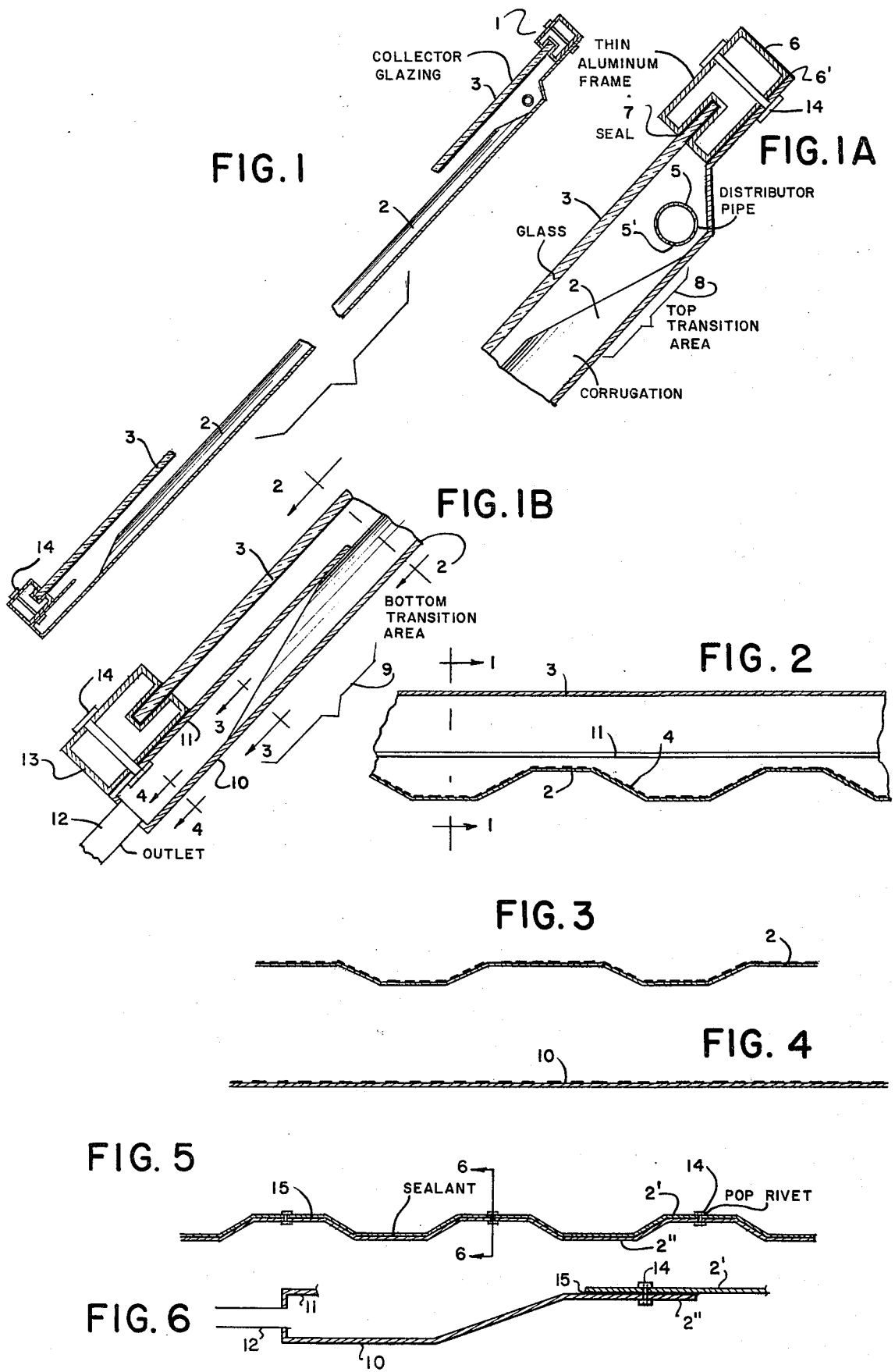

SOLAR HEAT COLLECTOR

INTRODUCTION, BRIEF SUMMARY

The basic open-flow type of solar heat collector was invented by Thomason, tested, and then placed in use for home-heating. For the first full winter, beginning in 1959, in the cold, half-cloudy climate near Washington, D.C., that type of collector supplied most of the heat from the sun. Now, 15 years later, rebuilt collectors are still supplying most of the heat from the sun for that 3-bedroom home.

Nevertheless, that basic type of solar collector needed improvement. On cold winter days some "steam" can be observed rising from the top, therefore the collector loses some heat and water. Also, it is possible for "steam" or water vapor to find its way behind the collector sheet where condensation could take place. A better seal was needed at the top. The collector sheet was corrugated, with hills and valleys. But, it could not be easily sealed to flat or planar surfaces, such as the solar heat collector glazing materials above, or the top end of the collector which had a flat surface, or the supporting member beneath the corrugated sheet. It was difficult to find low-cost materials that would withstand high temperatures during hot summer days, low temperatures during cold winter nights, high humidity and "steam" at times, and dry baking of the parts on hot summer days when there was no water flowing through the collector. There seemed to be no simple, easy, inexpensive, long-lived, way to seal the irregular, non-planar collector sheet to avoid problems between it and the substantially planar solar heat collector framework or glazing materials, etc. (The collector sheet is preferably embossed for greater heat collection efficiency, better heat-transfer, and better spreading of the liquid flowing thereover. And, it is preferably corrugated, V-crimped, or similarly formed to channel the water as it flows down).

At the bottom of the collector, the problem was compounded. There seemed to be no simple easy, inexpensive, long-lived, way to seal between the irregular, non-planar heat collector sheet and the adjacent section of the substantially planar trough that collects warm water, and the collector glazing materials. Improvement was needed but the answer was elusive for many years.

The simple answer is, a transition area or section, as taught herein. Simplicity is the height of invention. This simple transition area or section is inexpensive. It is easy to construct. It is able to withstand cold, heat, water, "steam", and so on for years. It is capable of forming a seal between the mis-matched parts. The corrugations, or V-crimps, or flattened hills and valleys, or such are substantially sealed to substantially planar parts by a transition area or section near the top and a transition area or section near the bottom. If desired the bottom transition area or section may be formed as a collector trough or gutter, thereby reducing costs and sealing problems.

In the drawing:

FIG. 1 is a partial cross-section along line 1—1 of FIG. 2, through an open-flow solar heat collector embodying the present invention.

FIG. 1A is an enlarged detail of the top of the collector.

FIG. 1B is an enlarged detail of the bottom of the collector.

FIG. 2 is a section along line 2—2 of FIG. 1B.

FIG. 3 is a section along line 3—3 of FIG. 1B.

FIG. 4 is a section along line 4—4 of FIG. 1B.

FIG. 5 illustrates a modification.

FIG. 6 is a section taken along line 6—6 of FIG. 5.

Solar heat collector 1 may be constructed as a large unit. It may cover a major part of the roof of a home. It preferably faces slightly west of south to collect solar energy to heat a home. Or, the solar heat collector may be built as a panel to be installed on a roof, or as a free standing unit, or otherwise. Several panels may be connected in parallel to heat larger volumes of water, or in series to achieve higher temperatures, or both.

Heat collectors similar to the type illustrated have been in use on Thomason solar homes near Washington, D.C. for many years. However, a problem needed solution. Moisture, water vapor, heat, etc. could find its way out near the top, or behind collector sheet 2. Moisture or "steam" could condense and damage parts behind the sheet, or trickle down the roof of the house. The irregular collector sheet left openings at the rises (corrugations) and there seemed to be no way to seal those openings for long-life, and at low cost. At the bottom the problem was similar, or a little worse. The warm water in the collector trough gave off vapor or "steam." Some of that could rise up through the openings (the rises of the corrugated sheet). That warm vapor could condense on cooler surfaces behind the collector sheet and waste water, cause deterioration of materials, and cause dripping of warm water and loss of heat.

Simplicity is the height of invention. The simple answer is to provide a transition area or section to change the irregular, non-planar collector sheet to a substantially planar shape. The drawings illustrate that feature as follows.

Glass, or other transparent material 3, admits solar energy to collector sheet 2 to warm it. Collector sheet 2 preferably has embossing 4 to help spread liquids flowing thereover, to increase heat transfer to the liquid flowing thereover, to strengthen the thin sheet, and to provide a better surface for a black solar-absorbing coating, helping keep the paint intact as the years go by.

A distributor pipe 5 has a small outlet hole 5' for each valley in the collector sheet. The collector sheet may be corrugated, V-crimped, or otherwise formed to channel fluid flowing down thereover, as taught in Thomason U.S. Pats. Nos. 3,145,707 and 3,215,134. For purposes of the present specification the various patterns are referred to as irregular, or non-planar. One of the best available is a corrugated, embossed, aluminum sheet having flat valleys and flat hill-tops as illustrated in the drawings. The liquid spreads wide across the flat valleys, and even climbs the sides of the valleys. That important and unusual action is assisted by the embossing. That yields better heat pickup because the liquid spreads over more of the warm surface.

A thin aluminum frame 6 with sealant, such as neoprene or vinyl 7, supports the top edge of glass 3. If desired sealant material 6' may also be used between thin frame 6 and the heat collector sheet to seal against vapor and warm air loss and to reduce heat loss by conduction from the collector sheet to the thin aluminum frame. That sealant may be calking sealant such as silicone seal, or neoprene, or vinyl, or other.

A transition area or section 8 adjacent to the top of the collector changes the collector sheet configuration from irregular, non-planar to substantially planar, and may be curved or otherwise shaped as needed to fit or match other parts of the collector. The transition area or section at the top is similar to that at the bottom and will be better understood by reference to the bottom transition area or section, illustrated in FIGS. 1B, 2, 3 and 4, more particularly described as follows.

Bottom transition area or section 9 changes from the full height corrugations, illustrated in FIG. 2; to partial height corrugations, illustrated in FIG. 3; to substantially planar, illustrated in FIG. 4. The planar section may be formed, as at 10, 11, to provide a collector trough, with an outlet 12. The lower transition area or section, or an extension, may be formed to mate with a glass supporting section 13 somewhat as at the top of the collector. Gaskets or sealants may be used to reduce heat and vapor loss, or heat conductivity from the warm collector sheet to the glass supporting member 13, or otherwise as needed.

FIGS. 5 and 6 illustrate a modification. The transition area or section may be formed as a separate section 2" attached to the collector sheet 2'. The connection may be by means of pop rivets, screws, bolts or such 14 and a sealant 15. FIG. 5 illustrates a section in an area similar to that where FIG. 2 is taken, that is, at an area near where the corrugated collector sheet ends. A transition section as at 2" may also be used at the top of the collector, if desired.

Either transition area or section could be used without the other. However, both, used together, are important.

We claim:

1. In a solar heat collector having an upper end and a lower end, a heat collecting sheet to be exposed to incoming solar radiations and capable of absorbing a portion of said radiations and converting them to heat to warm said heat collecting sheet, said heat collecting sheet having open hills and valleys extending substantially from the upper end to the lower end to channel liquid flowing, by gravity, down thereover, upper transition means adjacent to the upper end extending substantially from one side of the collector sheet to the other to change said hills and valleys to substantially planar cross-sectional configuration, distributor means adjacent to the upper end to introduce liquid to flow downward in streams in said valleys, liquid collector trough means adjacent to the lower end extending substantially from one side of the collector sheet to the other to collect liquid streams from said valleys, lower transition means changing from hills and valleys to substantially planar configuration to adapt to said trough means, and an outlet for gravity flow of liquid from said trough means.

2. Apparatus as in claim 1 and collector glazing material above said heat collecting sheet, the planar section of said upper transition means being shaped to mate with said collector glazing material.

3. Apparatus as in claim 2 and means securing said collector glazing material to said transition means.

4. Apparatus as in claim 3 and sealing means substantially sealing said collector glazing means with said transition means.

5. Apparatus as in claim 1 and collector glazing material above said heat collecting sheet, said trough means being shaped to mate with said collector glazing material.

6. Apparatus as in claim 5 and means securing said glazing material to said trough means.

7. Apparatus as in claim 1, said lower transition means being formed as a continuation of said irregular sheet and changing from multi-channels such as corrugations, V-crimp, etc., to substantially planar, and thence to trough-shaped configuration.

8. Apparatus as in claim 1, each of said transition means comprising a section formed to substantially match said irregular collector sheet and being secured thereto by substantially fluid-tight securing means.

9. Apparatus as in claim 8, and fluid sealant means between said transition means and said irregular collector sheet.

10. Apparatus as in claim 8, said securing means including pop-rivets.

* * * * *